United States Patent [19]

Nakadai

[11] Patent Number: 5,794,031

[45] Date of Patent: Aug. 11, 1998

[54] DISTRIBUTED PROCESSING SYSTEM FOR SYSTEM BOOTING AND SHUTDOWN IN DISTRIBUTED PROCESSING ENVIRONMENT

[75] Inventor: Takayuki Nakadai, Tokyo, Japan

[73] Assignee: NEC Corporation, Tokyo, Japan

[21] Appl. No.: 363,829

[22] Filed: Dec. 27, 1994

[30] Foreign Application Priority Data

Dec. 28, 1993 [JP] Japan .................................. 5-336206

[51] Int. Cl.$^6$ .................................................. G06F 9/445
[52] U.S. Cl. .................................................. 395/652
[58] Field of Search ................... 395/700, 651, 395/652, 611, 614, 615, 952; 370/58.1

[56] References Cited

U.S. PATENT DOCUMENTS

| | | | |
|---|---|---|---|
| 4,441,162 | 4/1984 | Lillie | 395/700 |
| 4,663,707 | 5/1987 | Dawson | 395/652 |
| 5,230,052 | 7/1993 | Dayan et al. | 395/700 |
| 5,257,378 | 10/1993 | Sidserf et al. | 395/700 |
| 5,280,627 | 1/1994 | Flaherty et al. | 395/700 |
| 5,305,457 | 4/1994 | Takida et al. | 395/700 |
| 5,325,532 | 6/1994 | Crossway et al. | 395/700 |
| 5,339,435 | 8/1994 | Lubkin et al. | 395/700 |
| 5,367,688 | 11/1994 | Croll | 395/700 |
| 5,390,170 | 2/1995 | Sawant et al. | 370/58.1 |
| 5,410,691 | 4/1995 | Taylor | 395/611 |
| 5,452,454 | 9/1995 | Basu | 395/700 |

FOREIGN PATENT DOCUMENTS

2173816  7/1990  Japan .

OTHER PUBLICATIONS

Reiss et al.; Unix System Administration Guide; Osborne McGraw–Hill; Berkeley, CA; 1993; Ch. 9—Unix Startup and Shutdown; pp. 220–248.

"The Design of the UNIX Operating System"; Maurice J. Bach; Prentice Hall Software Series; 1986.

*Primary Examiner*—Edward R. Cosimano
*Assistant Examiner*—Peter J. Corcoran, III
*Attorney, Agent, or Firm*—Whitham, Curtis & Whitham

[57] ABSTRACT

A distributed processing system which performs cooperative processing by client processes and server processes in a plurality of systems interconnected through a network. The distributed processing system comprises a system supervisor which controls the booting and shutdown of the respective systems and is connected to the network. Connected to the system supervisor is a client-server database which accumulates information related to the clients and servers for determination of systems to be booted or shut down and their booting or shutdown sequence.

The system supervisor comprises a recognition unit which recognizes the status of and a boot or shutdown request for each system; a boot request controller which determines systems to be booted and the their booting sequence and requests booting; a boot request send unit which sends the boot request to the system concerned; a shutdown request controller which determines systems to be shut down and their shutdown sequence and requests shutdown; a shutdown request send unit which sends the shutdown request to the system concerned; and a status information collection unit which collects information from each system.

Each system comprises a boot request receive unit which receives a boot request, a boot execution unit which executes the booting of the system in response to the boot request, a shutdown request receive unit which receives a shutdown request, a shutdown execution unit which executes the shutdown of the system in response to the shutdown request, and a status information provision unit which informs the system supervisor of the booting and shutdown of the systems and the status of the clients and servers.

20 Claims, 8 Drawing Sheets

```
# system_u config
SYSTEM:system_u:1
SERVER:A:1
SERVER:D:1
CLIENT:A:system_u:1
CLIENT:B:system_v:2
CLIENT:D:system_u:0
ENDSYSTEM:system_u
# system_v config
SYSTEM:system_v:1
SERVER:B:1
CLIENT:B:system_v:2
ENDSYSTEM:system_v
# system_w config
SYSTEM:system_w:1
CLIENT:A:system_u:0
CLIENT:C:system_z:1
CLIENT:D:system_u:3
ENDSYSTEM:system_w
# system_x config
SYSTEM:system_x:1
CLIENT:A:system_u:3
CLIENT:B:system_v:5
CLIENT:C:system_z:2
CLIENT:D:system_u:0
ENDSYSTEM:system_x
# system_y config
SYSTEM:system_y:1
CLIENT:A:system_u:2
CLIENT:B:system_v:4
CLIENT:D:system_u:5
ENDSYSTEM:system_y
# system_z config
SYSTEM:system_z:1
SERVER:C:1
CLIENT:A:system_u:1
CLIENT:B:system_v:2
CLIENT:C:system_z:3
ENDSYSTEM:system_z
```

FIG.2

DISTRIBUTED PROCESSING SYSTEM FOR SYSTEM BOOTING AND SHUTDOWN IN DISTRIBUTED PROCESSING ENVIRONMENT

BACKGROUND OF THE INVENTION

1. Field of the Invention

The present invention relates to a distributed processing system, and more particularly to a distributed processing system for booting or shutdown of a system in a distributed processing environment.

2. Description of the Related Art

In a distributed processing environment, a plurality of systems are interconnected through a network. In response to a request from a process on a system which is called the "client", a process on another system which is called the "server" provides services. Accordingly, when the client process completes, the server process must be alive on the network. Such relationship between server and client processes is detailed in, e.g., Maurice J. Bach. "The design of the UNIX Operating System": Prentice-Hall Inc., 1986.

As a technique to guarantee the presence of the server for the client as mentioned above, for example, Japanese Kokai HEI 2-173816 describes a power control method for servers in which the power for the server is automatically switched on or off, in linkage with the on/off status of the power for the client. According to this conventional technique, the system involving the client sends a certain signal directly to the system involving the server.

With the above prior art, however, since direct exchange of instructions for on/off switching of the power between the respective systems is required, the management becomes complicated. Therefore, with configurations composed of a plurality of servers in complex relationships with the clients, it may happen that on/off switching of the power cannot be performed efficiently, and occasionally the power cannot be switched on or off.

Generally, each system has two modes, that is single-user mode and multi-user mode. Single-user mode is a mode which allows only one user to log in the system, and it is a mode which is usually used by a privileged supervisor. Multi-user mode is a mode which allows a plurality of users to log in the system at the same time, and it is a mode usually used by a plurality of ordinary users from a plurality of terminals. The mode must be specified when the system is booted.

According to the prior art, however, since the mode cannot be specified when the power is switched on, the system cannot be booted in the desired mode. Further, since the mode of the system between the time of requesting shutdown of the system and actual shutdown of the system cannot be specified, shutdown of the system cannot be suspended in the desired mode.

SUMMARY OF THE INVENTION

An object of the present invention is to solve the above-mentioned problems to efficiently perform booting and shutdown of servers which may be in complex relationships with their clients.

Another object of the system is to allow selection of either single-user mode or multi-user mode as the mode for the system when the server is booted or shut-down.

In a preferred embodiment, the distributed processing system according to the present invention comprises a plurality of systems comprising functional servers or clients, a database which stores the dependency relationships between the servers and the clients of the systems, and a system supervisor which directs the booting or shutdown of the systems based on the dependency relationships between the servers and the clients stored in the database.

BRIEF DESCRIPTION OF THE DRAWINGS

Embodiments of the present invention will become clearer by an explanation given below with reference to the accompanying drawings in which:

FIG. 2 is a view illustrating the contents of the data to be stored in the server-client database according to the present invention;

DETAILED DESCRIPTION OF THE PREFERRED EMBODIMENTS

An embodiment of the system will now be explained in detail with reference to the drawings.

Figure 1:
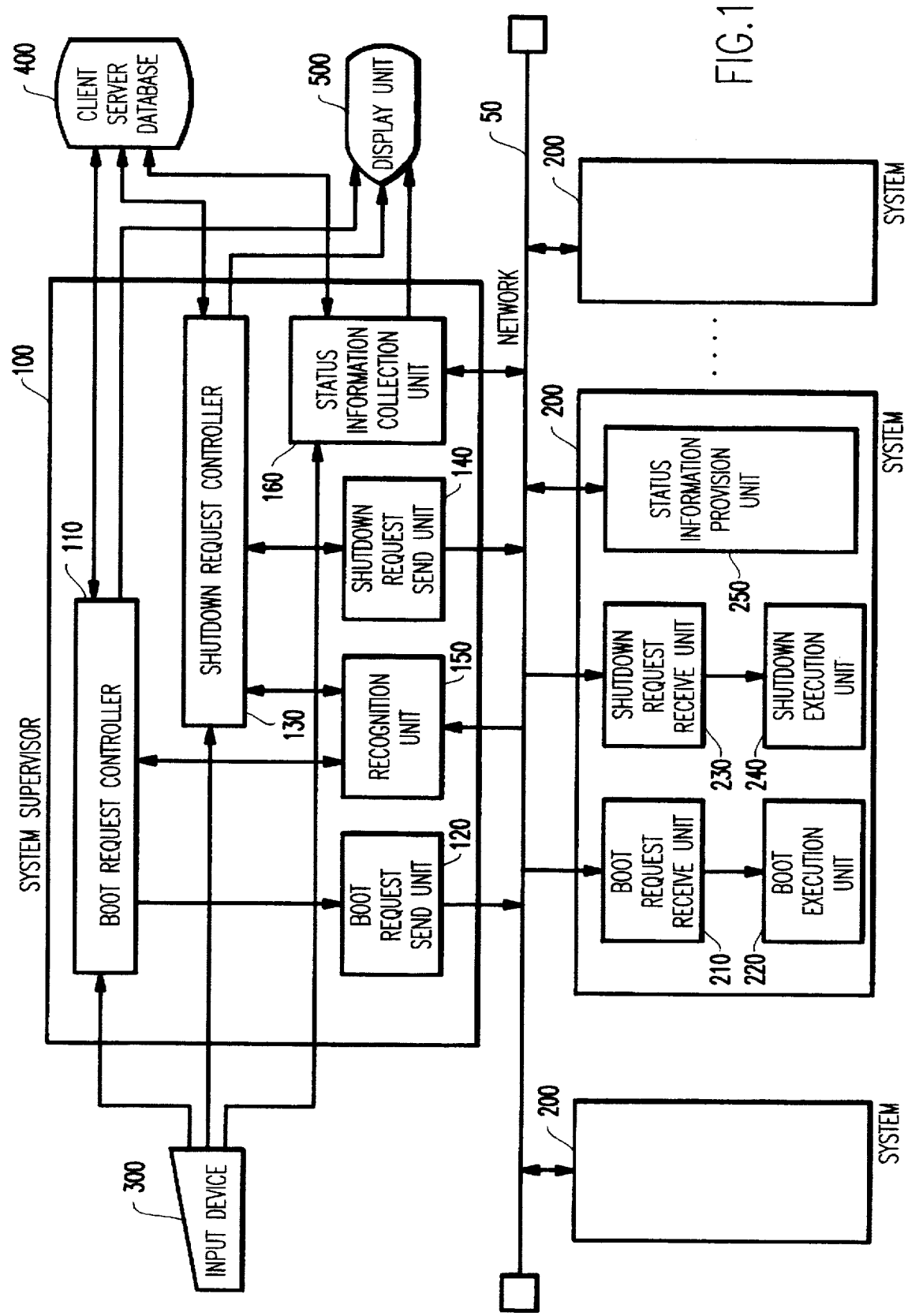
FIG. 1 A a block diagram of a distributed processing system according to e present invention.

Referring to FIG. 1, the distributed processing system according to a first embodiment of the present invention performs cooperative processing between client processes and server processes under control of a plurality of systems 200 interconnected through a network 50. In this distributed processing system, a system supervisor 100 which controls the booting and shutdown of the respective systems 200 is connected to the network 50 interconnecting the plurality of the systems 200.

Connected to the system supervisor 100 is an input device 300 which directs booting and shutdown of the system and directs collection of information. The system supervisor 100 comprises a recognition unit 150 which recognizes the status of and request for the booting and shutdown of each system 200; a boot request controller 110 which responds to an instruction for booting from the input device 300 or recognition unit 150 to determine systems to be booted and their booting sequence and requests booting; a boot request send unit 120 which sends the request for booting from the boot request controller, to the system concerned; a shutdown request controller 130 which determines systems to be shut-down and their shutdown sequence in response to an instruction for shut-down from the input device 300 or recognition unit 150; a shutdown request send unit 140 which sends a request for shutdown from the shutdown request controller 130, to systems concerned; and a status information collection unit 160 which collects information from each system 200 or receives an instruction for collection of information from the input device 300.

Each system 200 comprises a boot request receive unit 210 which receives a request for a boot, a boot execution unit 220 which executes the booting of the system in response to the request for a boot, a shutdown request receive unit 230 which receives a request for shutdown from the shutdown request send unit 140, a shutdown execution unit 240 which executes the shutdown of the system in response to the request for shutdown, and a status information provision unit 250 which notifies the system supervisor 100 of the booting and shutdown and the status of the clients and servers.

In addition, a client-server database 400 connecting to the system supervisor 100 accumulates information related to the clients and servers for determination of systems to be booted and their booting sequence at the boot request controller 110, and for determination of systems to be shut down and their shutdown sequence at the shutdown request controller 130.

Furthermore, a display unit 500 connecting to the system supervisor 100 displays information from the status information collection unit 160, information from the boot request controller 110 for the booting of systems, and information from the shutdown request controller 130 for the shutdown of systems.

Reference is made to FIG. 2 which shows an example of data stored in a client-server database. This example is for six systems 200 designated as system_u, system_v, system_w, system_x, system_y, and system_z, respectively. System_u comprises two servers designated as server A and server D, and three clients, or a client for server A, a client for server B and a client for server C. System_v comprises server B and a client for server B. System_w comprises no server, but only a client for server A, a client for server C and a client for server D are present therein. System_x also comprises no server, but four clients including a client for server A, a client for server B, a client for server C and a client for server D are present therein. System_y also comprises no server, and three clients including a client for server A, a client for server B, and a client for server D are present therein. System_z comprises server C, and three clients, including a client for server A, a client for server B, and a client for server C, are present therein.

In the format of the database of FIG. 2, "SYSTEM" represents the beginning of the definition of the system, and the current status of the system itself. More specifically, after "SYSTEM:" follows the name of the system, and the next number represents the status of the system. The number "0" signifies that the system is in the down status, whereas "1" signifies that the system is in the up status. "ENDSYSTEM" represents the end of the definition of the system.

"SERVER" represents the status of the server in the system. More specifically, after "SERVER:" follows the name of the server, and the next number represents the status of the server. The number "0" signifies that the server is in the down status, whereas "1" signifies that the system is in the up status.

"CLIENT" represents the status of the server in the system. More specifically, after "CLIENT:" follows the name of the server for the client, the next name represents the name of the system in which the server for the client is present, and the next number represents the number of the clients to be booted by the server.

An explanation will now be given regarding how to use the system_w with reference to FIG. 2, starting with the status where all the systems other than the system supervisor 100 are not yet booted. First, when the system supervisor 100 is directed to boot the system_w, the system supervisor 110 must request the booting of system_u and system_z comprising server A, server C and server D which is necessary for the booting of system_w, prior to requesting the booting of system_w. Requesting a boot is performed in such order that the machine with the server which the client present in each system uses is booted preferentially. Therefore, in order to boot system_u in which server A and server D for system_w are present, system_v in which server B, or the server for client B present in system_u, is present, must be booted first. Further, system_z which is the server for client C present in system_w must be booted. In order to boot system_z, system_u and system_v must be booted in advance in which server B, or the server for client A and client B present in system_z, is present. As mentioned above, since system_v must be booted prior to the booting of system_u, in conclusion the system supervisor 100 requests the booting of system_v, system_u and system_z in that order, and, after confirmation of their booting, requests the boot of system_w. Requested for booting, system_u, system_v, system_w, and system_z boot the systems.

An explanation will now be given regarding how to shut down system_w which is a server-free system with reference to FIG. 2, starting with the status where all the systems other than the system supervisor 100 are booted. When the system supervisor 100 is directed to shut down system_w, system supervisor 100, prior to requesting shutdown of system_w, confirms that no servers are running in system_w. In this particular case, since no server is present in system_w, it is confirmed that the system_w may be shut down individually.

Next, shutdown of system_z, or a system in which a server is present, will be explained with reference to FIG. 2, starting with the status where the system supervisor 100 and all the systems are booted. When the system supervisor 100 is directed to shut down system_z, the system supervisor 100, prior to requesting shutdown of system_z, detects the utilization of system_z by users, and confirms absence of servers in use by the other systems. If a server is in use by a user, then the subsequent operations are suspended.

Since server C is present in system_z, it is determined whether system_w and system_x in which clients for server C are present have been booted or not. Here, suppose that system_w has already been shut-down. Nevertheless, since system_x is still booted, the server in system_w cannot be shut-downed. Accordingly, until directed to shut down system_x, the system supervisor 100 suspends the request for shutdown of system_z. Upon confirmation of shutdown of system_x at the recognition unit 150, the shutdown request send unit 140 requests shutdown of system_z.

Next, operations involved in the above first embodiment of the present invention will be detailed with reference to the accompanying drawings.

Figure 3:
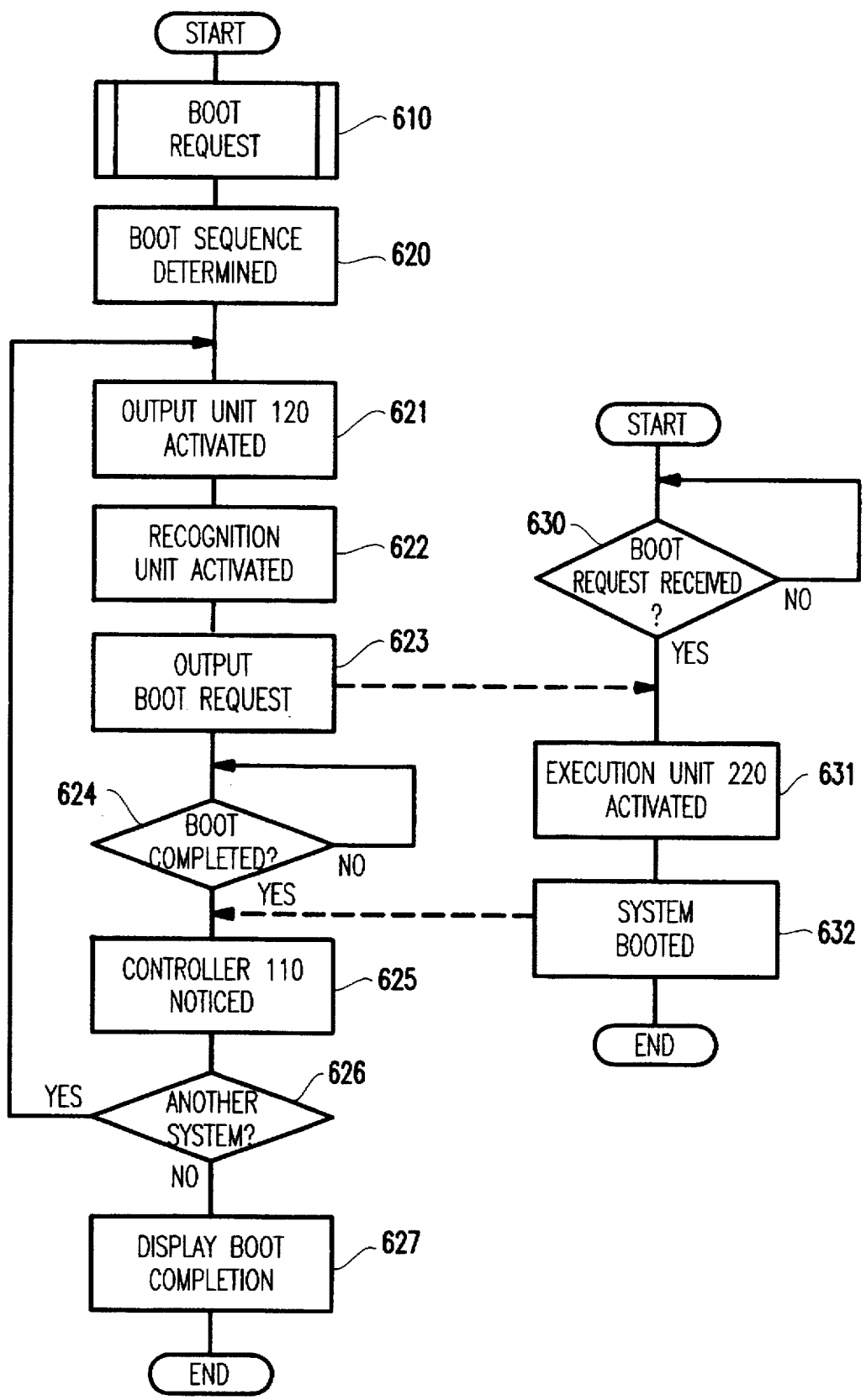
FIGS. 3–5 are views illustrating procedures for booting the system.
Figure 4:
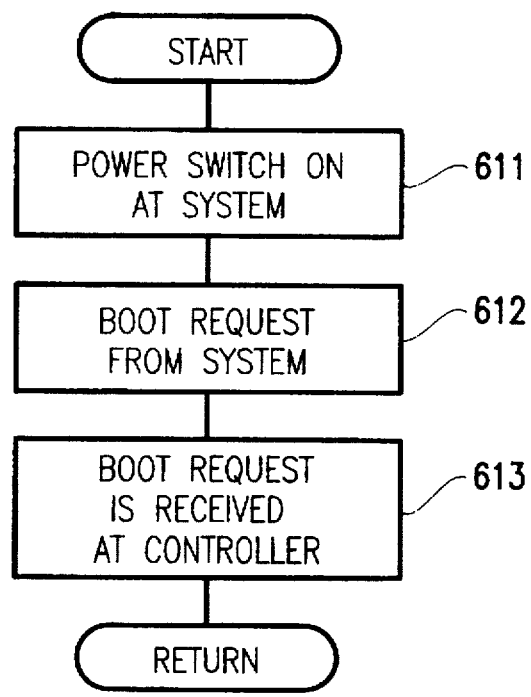

First, operations during booting of the systems will be explained with reference to FIGS. 1 through 5. Referring to FIG. 3, the boot of systems starts with recognition of a request for a boot by the system supervisor 100 (step 610). A boot may be requested, for example, in the following two ways:

Referring to FIG. 4, according to a first way of requesting a boot which directs booting by applying power to a system 200, when power is applied to a system 200 (step 611), the status information provision unit 250 of the system 200 informs the recognition unit 150 of a request for a boot (step 612). The recognition unit 150 receives the information as an instruction for booting, and informs the instruction to the boot request controller 110 (step 613).

Figure 5:
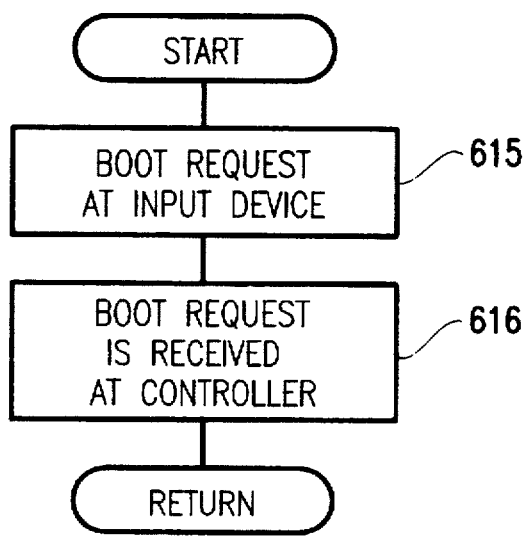

Referring to FIG. 5, according to a second way of requesting a boot which directs booting of the system 200 to be used from an input device 300, the input device 300 directs booting (step 615), and the instruction is transmitted to the boot request controller 110 (step 616).

In either of the above ways of requesting a boot, the boot request controller 110 determines systems to be booted and their booting order based on the information of the client-server database (step 620). Upon determination of the booting order, the boot request controller 110 requests a boot in that booting order (step 621) to the boot request send unit 120, and directs the recognition unit 150 to recognize whether booted or not (step 62). The boot request send unit 120 sends a request for a boot to the boot request receive unit 210 of the system 200 (step 623). The recognition unit 150 monitors whether the system has been booted or not (step 624).

On the other hand, the system 200 suspends the subsequent operations until the boot request receive unit 210 is informed of the request for a boot (step 630), and upon receipt of the request for a boot the boot request receive unit 210 directs the boot execution unit 220 to perform booting (step 631). Then the boot execution unit 220 boots the system (step 632).

Upon completion of the booting of the system 200, the recognition unit 150 of the system supervisor 100 recognizes the booting of the system 200 (step 624), and informs the boot request controller 110 of the completion of the booting (step 625). The boot request controller 110 which has received an information on the completion of the booting inspects whether an additional system to be booted next is present (step 626), and, in cases in which an additional system to be booted is present, performs the next request for a boot in the booting order in the same manner as the above. Upon completion of the booting of all the systems 200 for which booting was requested, a message indicating the completion of the system booting appears on the display unit 500 (step 627).

Figure 6:
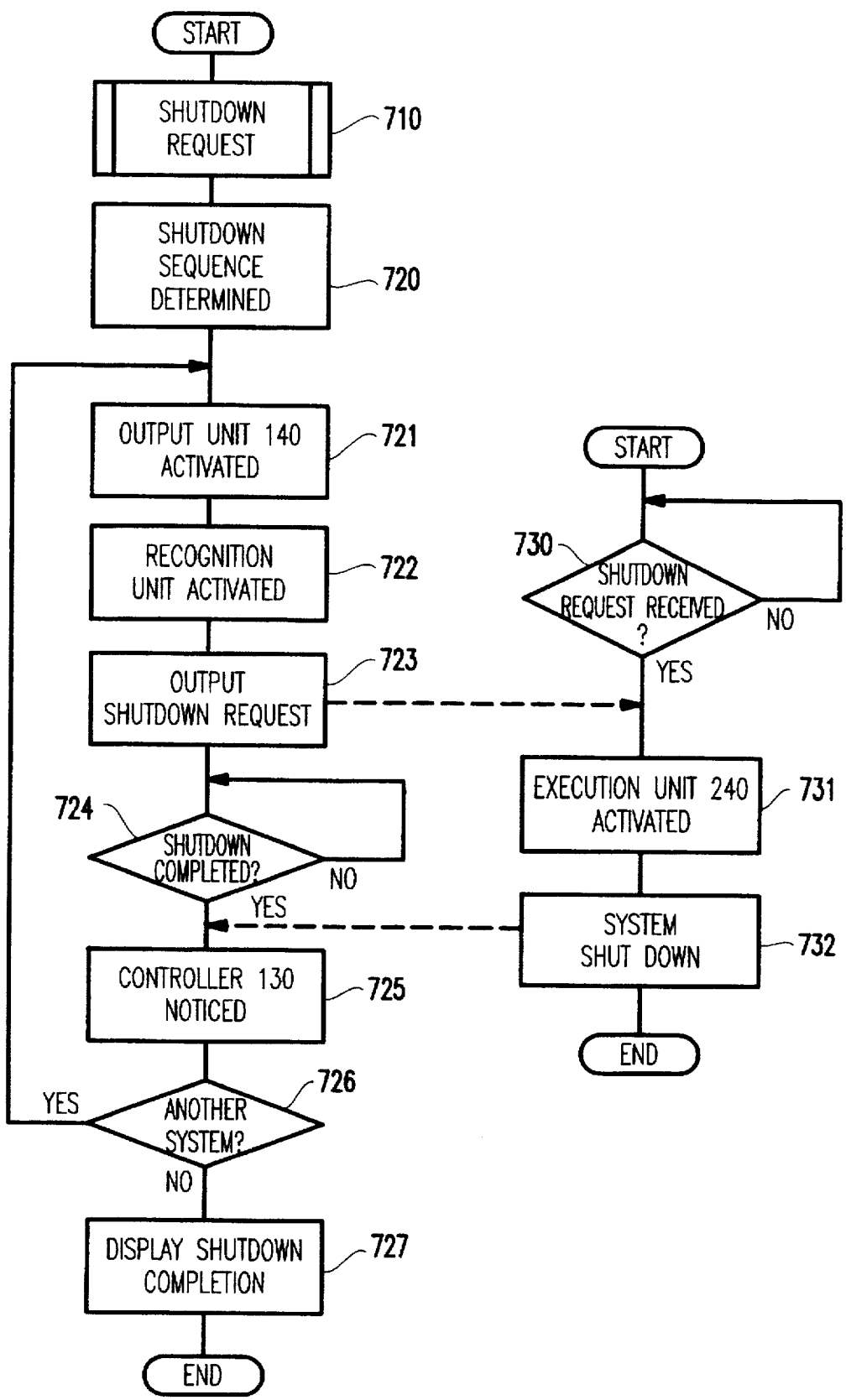
FIGS. 6–8 are views illustrating procedures for shutdown of the system.
Figure 7:
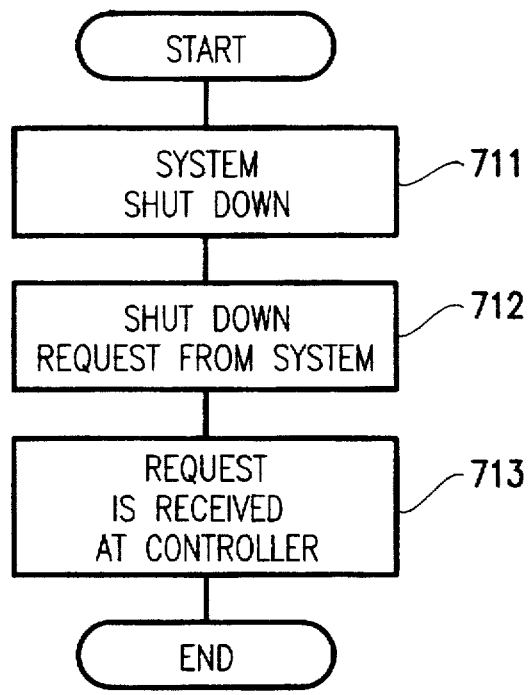

Operations during system booting will now be explained with reference to FIG. 1, FIG. 2 and FIGS. 6 through 8. Referring to FIG. 6, the booting of the system starts with recognition of the shutdown by the system supervisor 100 (step 710). Shutdown may be requested, for example, in the following two ways:

Referring to FIG. 7, according to a first way of requesting shutdown which directs shutdown using the shutdown of a system 200 as the trigger, when the system 200 is shut down (step 711), the status information provision unit 250 of the system 200 informs the recognition unit 150 of an instruction for shutdown (step 712). The recognition unit 150 transmits the instruction to the shutdown request controller 130 (step 713).

Figure 8:
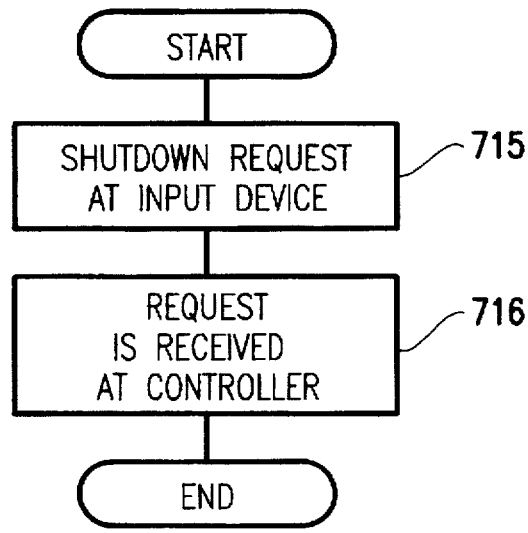

Referring to FIG. 8, according to a second way of requesting shutdown which directs to shut down the system 200 to stop using it, from an input device 300, the input device 300 directs shutdown (step 715), and the instruction is transmitted to the shutdown request controller 110 (step 716).

In either of the above ways of requesting shutdown, the shutdown request controller 130 determines systems to be shut down and their shutdown order based on the information of the client-server database 400 (step 720). Upon determination of the shutdown order, the shutdown request controller 130 requests shutdown in that shutdown order to the shutdown request send unit 140 (step 721), and directs the recognition unit 150 to recognize whether the system(s) has(have) been shut down or not (step 722). The shutdown request send unit 140 sends a request for shutdown to the shutdown request receive unit 230 of the system 200 (step 723). The recognition unit 150 monitors whether the system has been shut-downed or not (step 724).

On the other hand, the system 200 suspends the subsequent operations until the shutdown request receive unit 230 is informed of a request for shutdown (step 730), and upon receipt of the request for shutdown the shutdown request receive unit 230 directs the shutdown execution unit 240 to perform shutdown (step 731). Then the shutdown execution unit 240 shuts down the system (step 732).

Upon completion of the shutdown of the system 200, the recognition unit 150 of the system supervisor 100 recognizes the shutdown of the system 200 (step 724), and informs the shutdown request controller 130 of the completion of the shutdown (step 725). The shutdown request controller 130 which has received an information on the completion of the shutdown inspects whether an additional system to be shut down next is present (step 726), and, in cases where an additional system to be shut down is present, performs the next request for shutdown in the shutdown order in the same manner as the above. Upon completion of the shutdown of all the systems 200 for which shutdown was requested, a message advising the completion of the system shutdown appears on the display unit 500 (step 727).

Figure 9:
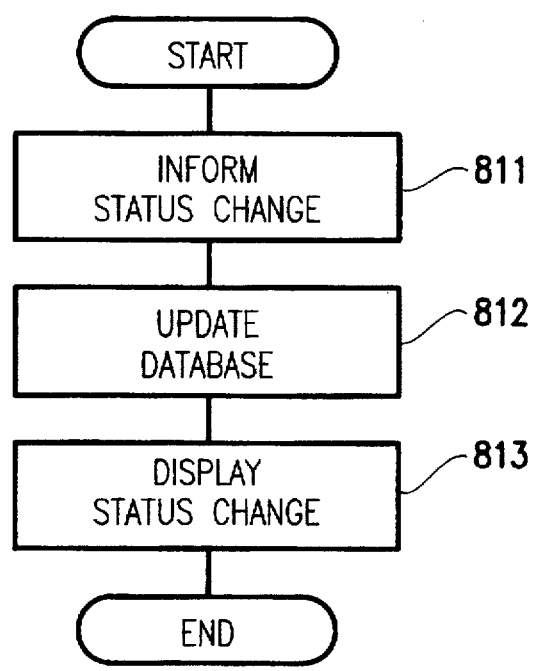
FIG. 9 is a view illustrating a procedure for recognition of changes in the status of a server.

Next, processing for recognition of changes in the status of servers will be explained with reference to FIG. 1 and FIG. 9.

In the system 200, in cases where the status of servers changes, including change of servers to be booted, shutdown of servers and failures in servers, the system 200 informs the status information collection unit 160 of the system supervisor 100 of the changes in the status, through a status information provision unit 250 (step 811). The status information collection unit 160 updates the client-server database 400 based on the information (step 812), and displays the updating on the display unit 500 (step 813).

Figure 10:
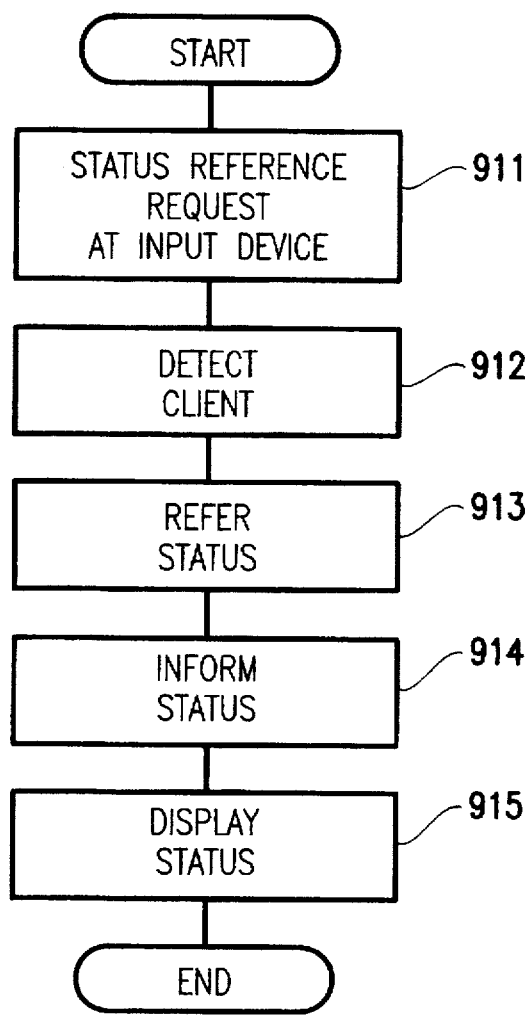
FIG. 10 is a view illustrating a procedure for determining the status of a server.

Next, processing for inspecting the status of the servers will be explained with reference to FIG. 1 and FIG. 10.

When the status of a server of a system 200 is being referred to, the input device 300 directs the status information collection unit 160 to refer to the status (step 911). Based on the information of the client-server database 400, the status information collection unit 160 detects a system in which a client using the server is present (step 912). Then, the status information collection unit 160 inquires the status information provision unit 250 of the system 200 in which the server and its client, about the status of the server and the client (step 913). The status information provision unit 250 informs the status information collection unit 160 of the status of the client and the server under inquiry (step 914). The status information collection unit 160 displays the information on the display unit 500 (step 915).

Thus, according to the first embodiment of the present invention the booting and shutdown of servers may be performed efficiently even in the case where the server-client relationships are complex.

Next, a second embodiment of the present invention will be explained with reference to the accompanying drawings.

Referring to FIG. 1, the second embodiment of the present invention is a distributed processing system, wherein a plurality of systems 200 interconnected through a network 50 performs cooperative processing by client processes and server processes in the same manner as in the first embodiment. This second embodiment is different from the first embodiment in that a mode for booting and shutdown may be specified when they are performed.

According to the second embodiment, a boot mode may be specified when boot is requested, whereas a shutdown mode may be specified when shutdown is requested. When the boot mode received by the boot execution unit 220 shown in FIG. 1 is a multi-user mode, the system booted thereby is in a multi-user mode, and a plurality of ordinary users are allowed to log in. On the other hand, in cases where the boot mode received by the boot execution unit 220 shown in FIG. 1 is a single-user mode, the system booted thereby is in a single-user mode which functions only as a server, and does not allow a plurality of ordinary users to log in. In order to boot the system in a multi-user mode, an additional instruction for booting the system is required.

According to the second embodiment, in step 620 the boot request controller 110 enters the boot mode added to the boot requested. When this is entered, the boot mode is transmitted to the boot execution unit 220 through the boot request send unit 120 and the boot request receive unit 210, and the system is booted in the specified mode.

Further, according to the second embodiment a shutdown mode may be specified when shutdown is requested. That is, in step 720 the shutdown request controller 130 enters the shutdown mode added to the request for shutdown. When this is entered, the shutdown mode is transmitted to the shutdown execution unit 240 through the shutdown request send unit 140 and shutdown request receive unit 230, and the system is shut down in the specified mode.

When the system is being shut down, first it is determined whether the server is serving a client, and, if in service, then the shutdown of the system is postponed until the service to the client is completed. In this connection, when the shutdown mode is a multi-user mode, the system runs in a multi-user mode, and allows another user to log in as long as the shutdown of the system is suspended. On the other hand, when the shutdown mode is a single-user mode, the system does not allow a new log-in by another user after being directed for shutdown of the system, even during the suspension of the shutdown of the system.

Differences in operations between the two shutdown modes will be explained with reference to the embodiment of FIG. 2 mentioned above.

An explanation will be made regarding how the system_z, or a system in which a server is present, is shut down, starting with the status wherein the system supervisor 100 and all the systems are booted. When the system supervisor 100 is directed to shut down system_z, the system supervisor 100, prior to requesting shutdown of system_z, detects the utilization of system_z by users, and confirms absence of servers in use by the other systems. If a server is in use by a user, then the subsequent operations are suspended.

Since server C is present in system_z, it is determined whether system_w and system_x in which clients for server C are present have been booted or not. Here, suppose that system_w has already been shut down. Nevertheless, since system_x is still booted, the server in system_w cannot be shut down. The shutdown mode received by the shutdown execution unit 240 of system_x is a multi-user mode, system_z continues to run in a multi-user mode even without a logging-in user. Accordingly, until being directed to shut down system_x, the system supervisor 100 suspends requesting shutdown of system_z. Upon confirmation of the shutdown of system_x at the recognition unit 150, the shutdown request send unit 140 requests the shutdown of system_z.

On the other hand, in the case where the shutdown mode received by the shutdown execution unit 240 of system_x is a single-user mode, the system_z rejects new logging-in, and serves only as a server. When the shutdown of system_x is confirmed by the recognition unit 150, the shutdown request send unit 140 requests the shutdown of the system_z. This single-user mode may be advantageously used when, for example, the system is shut down after other ordinary users log off the system during the logging-in of a super user from the console.

As mentioned above, according to the second embodiment of the present invention, either single-user mode or a multi-user mode may be specified as the mode for the system when the server is booted or shut down.

In summary, the present invention allows distributed processing systems to have centralized control over the booting and shutdown of the respective systems, thereby enabling the systems to determine the relationships between the client processes and server processes and to perform booting and shutdown efficiently even when the client processes and server processes are complicated with each other. In addition, changes in the status of servers due to failures, etc. may be readily found.

What is claimed is:

1. A distributed processing system comprising:
    a plurality of systems on which zero or more server processes or zero or more client processes are scheduled to be run;
    a database for storing information indicating which of said zero or more server processes and the zero or more client processes are to be run on each of said systems; and
    a system supervisor for determining a booting order or a shutdown order of said systems based on said information stored in said database.
    wherein said system supervisor includes:
        a unit for recognizing the information on the booting of the system from said system;
        a unit for requesting the booting of a system which is selected based on the dependency relationships between the zero or more server processes and the zero or more client processes stored in said database when said recognizing unit recognizes the booting of the system; and
        a status information collection unit for collecting information on the status of the system from said status information provision unit of a system and for updating said database.

2. The distributed processing system according to claim 1, wherein the booting comprises a routine for starting-up of a system of said systems.

3. The distributed processing system according to claim 1, wherein the booting comprises a routine for applying power to a system of said systems,
    wherein said dependency relationships include information indicating which process is executed on each system, and information indicating whether each system is used by each process as a client machine or as a server machine.

4. The distributed processing system according to claim 1, wherein said database stores information indicating which process is executed on each system, and information indicating whether each system is used by each process as a client machine or as a server machine.

5. The distributed processing system according to claim 1, wherein said system supervisor comprises a boot request controller for controlling a booting order of systems of said plurality of systems and a shutdown order among systems, by referring to the database, and
    wherein said boot request controller, in response to a booting request to a first system, when a process, which uses the first system as a client machine, uses a second system as a server machine, the boot request controller boots the second system in advance of the booting of the first system, wherein said boot request controller includes a unit for determining systems to be booted based on information stored in said database.

6. The distributed processing system according to claim 1, wherein said system supervisor comprises a boot request controller and a shutdown request controller, wherein, in response to a booting request to a first system, when a process, which uses the first system as a client machine, uses a second system as a server machine, the boot request controller boots the second system in advance of the booting of the first system, wherein said shutdown request controller controls a shutdown order among systems, by referring to the database, and wherein, in response to the shutdown request to a first system, when a process, which uses the first system as a server machine, uses a second system as a client machine, the shutdown request controller shutdowns the second system in advance of the shutdown of the first system.

7. The distributed processing system according to claim 1, wherein when a system is being shutdown in a shutdown mode, the shutdown of the system is postponed until service to a client is completed, and wherein when the shutdown mode is in a multi-user mode, said system is run in a multi-user mode and allows another user to log-in so long as the shutdown of the system is suspended, wherein when the shutdown mode is in a single-user mode, said system preventing another user from logging-in regardless of whether the shutdown of the system is suspended or not.

8. A distributed processing system comprising:

a plurality of systems interconnected through a network which execute either or both of zero or more server processes and zero or more client processes;

a database for storing information indicating which of said zero or more server processes and the zero or more client processes are to be run on each of said systems; and a system supervisor provided separately from said systems, but connected thereto through said network, for determining a booting order of said systems based on said information stored in said database, wherein each of said systems includes:

a unit for booting the system upon receipt of a request for a boot from said system supervisor; and a status information provision unit which informs said system supervisor of the booting of the system, and further informs said system supervisor of a status of the zero or more server processes and the zero or more client processes in the system, and wherein said system supervisor includes:

a unit for recognizing the information on the booting of the system from said system;

a unit for requesting the booting of a system which is selected based on the dependency relationships between the zero or more server processes and the zero or more client processes stored in said database when said recognizing unit recognizes the booting of the system; and a status information collection unit for collecting information on the status of the system from said status information provision unit of a system and for updating said database.

9. The distributed processing system according to claim 8, wherein the booting comprises a routine for starting-up of a system of said systems.

10. The distributed processing system according to claim 8, wherein the booting comprises a routine for applying power to a system of said systems, wherein said dependency relationships include information indicating which process is executed on each system, and information indicating whether each system is used by each process as a client machine or as a server machine.

11. A distributed processing system comprising:

a plurality of systems interconnected through a network which execute either or both of zero or more server processes and zero or more client processes;

a database for storing information indicating which of said zero or more server processes and the zero or more client processes are to be run on each of said systems; and a system supervisor provided separately from said systems, but connected thereto through said network, for determining a booting order or a shutdown order of said systems based on said information stored in said database, wherein each of said systems includes:

a unit for booting the system upon receipt of a request for a boot from said system supervisor; and a status information provision unit which informs said system supervisor of the booting of the system, and further informs said system supervisor of the status of the zero or more server processes and the zero or more client processes in the system, and wherein said system supervisor includes:

a unit for recognizing the information on the shutdown of the system from said system;

a unit for requesting the shutdown of a system which is selected based on the dependency relationships between the zero or more server processes and the zero or more client processes stored in said database when said recognizing unit recognizes the shutdown of the system; and a status information collection unit for collecting information on the status of the system from said status information provision unit of a system and updating said database.

12. The distributed processing system according to claim 11, wherein the booting comprises a routine for starting-up of a system of said systems.

13. The distributed processing system according to claim 11, wherein the booting comprises a routine for applying power to a system of said systems, wherein said dependency relationships include information indicating which process is executed on each system, and information indicating whether each system is used by each process as a client machine or as a server machine.

14. A distributed processing system comprising:

a plurality of systems interconnected through a network which execute either or both of zero or more server processes and zero or more client processes;

a database for storing information indicating which of said zero or more server processes and the zero or more client processes are to be run on each of said systems; and a system supervisor provided separately from said systems, but connected thereto through said network, for determining a booting order or a shutdown order of said systems based on said information stored in said database, wherein each of said systems includes:
- a unit for booting the system upon receipt of a request for a boot from said system supervisor;
- a unit for performing the shutdown of the system upon receipt of a request for shutdown from said system supervisor; and
- a status information provision unit which informs said system supervisor of the booting or shutdown of the system, and further informs said system supervisor of a status of the zero or more server processes and the zero or more client processes in the system, and wherein said system supervisor includes:
- a unit for recognizing the information on the booting or shutdown of the system from said system;
- a unit for requesting the booting of a system which is selected based on the dependency relationships between the zero or more server processes and the zero or more client processes stored in said database when said recognizing unit recognizes the booting of the system;
- a unit for requesting the shutdown of a system which is selected based on the dependency relationships between the zero or more server processes and the zero or more client processes stored in said database when said recognizing unit recognizes the shutdown of the system; and
- a status information collection unit for collecting information on a status of the system from said status information provision unit of a system and updating said database.

15. The distributed processing system according to claim 14, wherein the booting comprises a routine for starting-up of a system of said systems.

16. The distributed processing system according to claim 14, wherein the booting comprises a routine for applying power to a system of said systems,
wherein said dependency relationships include information indicating which process is executed on each system, and information indicating whether each system is used by each process as a client machine or as a server machine.

17. A distributed processing system comprising:
a plurality of systems interconnected through a network which execute either or both of zero or more server processes and zero or more client processes;
a database for storing information indicating which of said zero or more server processes and the zero or more client processes are to be run on each of said systems;
a system supervisor provided separately from said systems, but connected thereto through said network, for determining a booting order of said systems based on said information stored in said database; and
an input device for directing the booting and shutdown of said systems and directing collection of information, wherein each of said systems includes:
- a unit for booting the system upon receipt of a request for a boot from said system supervisor; and
- a status information provision unit which informs said system supervisor of the booting of the system, and further informs said system supervisor of the status of the zero or more server processes and zero or more client processes in the system, and wherein said system supervisor includes:
- a unit for recognizing the information on the booting or shutdown of the system from said system, or a request for a boot or shutdown of a system from said input unit;
- a unit for requesting the booting of a system which is selected based on the dependency relationships between the zero or more server processes and the zero or more client processes stored in said database when said recognizing unit recognizes the booting of the system, or receives a request for booting the system from said input unit;
- a unit for requesting the shutdown of a system which is selected based on the dependency relationships between the zero or more server processes and the zero or more client processes stored in said database when said recognizing unit recognizes the shutdown of the system, or receives a request for shutdown of the system from said input unit; and
- a status information collection unit for collecting information on the status of the system from said status information provision unit of a system and updating said database.

18. The distributed processing system as claimed in claim 17, wherein said input unit specifies the booting mode or the shutdown mode when it directs the booting or shutdown of a system,
wherein said booting unit boots the system in said booting mode when it boots the system, and said shutdown unit shuts down the system in said shutdown mode when it shuts down the system.

19. The distributed processing system according to claim 17, wherein the booting comprises a routine for starting-up of a system of said systems.

20. The distributed processing system according to claim 17, wherein the booting comprises a routine for applying power to a system of said systems,
wherein said dependency relationships include information indicating which process is executed on each system, and information indicating whether each system is used by each process as a client machine or as a server machine.

\* \* \* \* \*